3,030,222
PROCESS FOR MANUFACTURE OF AGGREGATE MATERIAL AND PRODUCT OBTAINED THEREBY
Adelbert C. Eichenlaub, Dearborn, Mich., assignor to American Cement Corporation, Detroit, Mich., a corporation of Delaware
No Drawing. Filed Dec. 2, 1958, Ser. No. 777,574
9 Claims. (Cl. 106—288)

This invention relates to a process for manufacturing aggregate material useful as a construction material. More particularly, the invention contemplates the use of various industrial waste materials to form a commercially valuable lightweight aggregate.

The disposal of the fly ash carried by the combustion products of pulverized coal has been a long standing problem. It is usually collected from the combustion gases by means of an electrostatic precipitator and then stored. While fly ash has a limited market value, its marketability is seasonal and is subject to considerable sales expense. For the major portion of the year, fly ash is disposed of as a waste product, the expense of which results in increased costs.

The present invention proposes to nodulize fly ash with a binder of sewage sludge cake and then sinter the nodules to form a lightweight aggregate.

This invention additionally proposes to utilize the fuel value of sludge cake to promote the sintering of the fly ash.

The present invention thus provides a commercially feasible process for utilizing two waste products to provide a new and desirable form of lightweight aggregate.

As in the case with fly ash, sewage sludge cake also creates a disposal problem. Sewage sludge cake is produced in an intermediate stage of a sewage disposal system currently used in a large number of sewage disposal plants. Briefly, the system consists of first screening raw sewage to remove any large objects which are present and then passing the sewage through grit chambers where the heavy, generally inorganic particles, such as sand, settle out. The raw sewage may then be chemically treated, to destroy the major portion of the organisms contained therein. The next step is to pass the sewage through a sedimentation tank where the major portion of solids remaining in the sewage is settled out in the form of sewage sludge. Sewage sludge is a soft mud comprising about 90 percent water and the sediments contained in the sewage. The sewage sludge is removed from the sedimentation tanks and prepared for burning. This is usually accomplished by first treating the sludge chemically by the addition of lime and ferric chloride and then passing it through a dewatering process where a portion of the water is removed. The dewatered product, termed sewage sludge cake, contains approximately 70 percent water. Sludge cake is then normally burned in an incinerator and the resultant ash disposed of as a fill material. The incineration and disposition of the ash constitute a relatively expensive step, especially for cities handling a large volume of sewage, the average cost of sludge cake disposal presently being above $2 per ton.

Proposals have heretofore been made for drying sewage sludge without converting it into cake by the use of a drying agent such as ash. One such method is disclosed in the patent to Greenawalt, 1,895,159. Greenawalt teaches combining the sewage sludge with a water absorptive material such as ashes. The function of the ashes is not only to absorb water but also to create voids in the mixture for the passage of air therethrough so that it can be sintered. The mixture is burned by placing it on a pervious support and igniting it at its surface. Burning is promoted by directing a strong draft of air downwardly through the charge. The sintered charge may be used as a concrete aggregate.

There are, however, several deficiencies inherent in such a process when it is considered from the point of view of commercial practicability. The use of sewage sludge rather than sludge cake means that the large amount of water present in the sludge must be absorbed by the ash. This results in a very narrow range of ash which may be added to achieve the desired aggregate composition since sufficient ash must be supplied to absorb the water but not more than the solid matter in the sludge can bind together.

Furthermore, the necessity for a strong downdraft to burn the sludge-ash mixture as a result of the dampness and compactness of the charge means that the process cannot be carried out in standard equipment using, for example, a conventional sintering grate. The use of special equipment adds appreciably to the cost of producing the aggregate.

The object of the present invention is, therefore, to provide a process for producing aggregate from industrial wastes such as fly ash and sewage sludge cake, the process being capable of producing a lightweight aggregate having closely controllable physical and chemical properties and capable of being effectuated by means of conventional equipment.

In its broadest aspect the process of the present invention comprises first intimately intermixing fly ash with sewage sludge cake, pelletizing the mixture to form small pellets or nodules, burning the nodules to form a sintered material, crushing and grading the resultant sintered mass to the desired aggregate size, or optionally, water quenching the aggregate, crushing and storing it for a time in a damp state to remove or alter any undesirable mineral materials which may be present in the aggregate.

The process as briefly outlined above results in a concrete aggregate which may be termed "lightweight" aggregate. Lightweight aggregate is generally 30–40 percent lighter than the standard sand and gravel aggregate used in concrete. It is usually a manufactured product commonly made by expanding shale or clay in a rotary kiln, spraying water on a molten slag, or burning a shale or clay on a sintering grate. Lightweight aggregate has recently become an important building material due to a steadily growing demand in all phases of construction.

The first step of the present process, i.e., the intimate intermixing of fly ash with sewage sludge cake, is preferably carried on until a homogeneous mixture is achieved. This will normally require both mixing and grinding. The mixing may be accomplished in suitable apparatus such as a pug mill. Other materials may be added in addition to the fly ash and sludge cake. For example, suitable fuels may be added to increase the fuel value of the mixture. Such materials as clay, sand, and waste cement kiln flue dust may also be added to improve the properties of the resultant aggregate. The added sand may be a waste sand such as occurs in a foundry or a glass making plant.

Sand increases the glass content of the aggregate and makes it less water absorptive, a desirable aggregate characteristic.

Clay increases the bulk density of both the fly ash-sludge cake mixture and the final aggregate product. An increase in the bulk density of the fly ash-sludge cake mixture is beneficial in that it increases the capacity of the pelletizing and sintering machines. Pelletizing and sintering machines have a fixed capacity measured in volume per unit of time. Loading the machines with a heavier material results in larger weight to volume ratio. An increased bulk density of the final aggregate is advantageous in that it results in a higher strength material.

The fly ash-sludge cake mixture is relatively plastic and readily pelletized, the term "plastic" being here used in the sense of a material capable of being molded. Sludge cake is a plastic material due to the nature of the entrained solids and the high percentage of water which it contains (as previously noted, water forms approximately 70 percent of sludge cake). However, in some cases, particularly where a relatively large proportion of dry fly ash is to be added, it is desirable to add more water or other liquid. When the water is maintained at between 25 and 40 percent, a plastic, easily pelletized mix will result. If water is added, it is preferably added during the pelletizing step. The plastic mixture is pelletized to form small pellets or nodules suitable for burning. The pelletizing may be accomplished in any suitable equipment such as a rotating pan or drum nodulizer.

Consideration should be given to nodule size and gradation, particularly when a sintering grate is to be used to burn the nodules. The nodules must be large enough to prevent filling in of the sintering bed and blocking the air flow necessary to maintain combustion. However, they must be small enough to burn through during the burning time on the sintering grate. Nodule size may be controlled by means of equipment such as a balling pan or a balling drum. Nodule size is also important, of course, when other equipment, such as a rotary or vertical kiln, is used in the burning of the nodules.

The pelletizing step as outlined above will result in pellets having generally globular shapes. However, the word "pelletizing" as used herein is meant to include any shape or method of compacting the sludge-cake fly ash mixture to form a suitable sinterable material. For instance, the mixture may be formed by briquetting, compacting, flaking, or extruding. The importance of forming the mixture into individual shapes resides in the creation of voids in the sintering charge for the passage of air therearound to promote burning during sintering.

The nodules have sufficient strength for subsequent handling and will retain their form during firing. Nodule strength is particularly important during the initial phase of burning. The stresses produced by the rapid conversion of the water in the nodules to steam as the temperature is quickly increased require that the nodules have a relatively high strength. The high strength of the nodules is due principally to the binding properties of the sludge cake. It is believed that the excellent binding properties of sludge cake are due partly to the stringy nature of sewage sludge cake. The cake contains a considerable amount of stringy material which intertwines with the other sewage solids and the fly ash to form what in effect is a fibrous reinforced structure.

The good binding properties of the sludge cake also result in a minimum of fines being formed during the burning and sintering step. Fines are solid particles of ash which break away from the sintered mass and must be separated from the final aggregate. Fines tend to block the draft through the charge and thus inhibit burning. They also represent a loss since they reduce the output of aggregate and must be recycled, thus requiring extra fuel consumption.

The next step in the process is to burn the nodulized fly ash to form a sintered mass. Burning and sintering may be accomplished by means of conventional types of sintering equipment. One suitable form of such sintering equipment comprises a series of disconnected grate-bottomed pallets which carry a charge of pellets under a burner which ignites the charge and then over a series of windboxes having a fan which supplies the air necessary for combustion. Other suitable burning equipment, such as a rotary or vertical kiln, may also be used.

Burning is of course facilitated by the nodule or pellet shape of the fly ash-sludge cake mixture, which has a high surface to volume ratio. Fuel efficiency is also achieved as a result of the burnable nature of sludge cake and fly ash. Once the nodules have been ignited, they will continue burning alone. Fly ash contains some coke. Sludge cake comprises essentialy combustible organic matter. The combined fly ash and sludge cake mix in a typical instance will have a fuel value of approximately 1,830 B.t.u.'s per pound.

As previously mentioned, the fuel value of the nodule charge may be supplemented by the addition of small amounts of fuel. Supplemental fuel may be incorporated into the nodules themselves prior to pelletizing or it may be intermixed with the nodules prior to sintering. Suitable supplemental fuels are for example various cokes, coke breeze, coal, lignite, peat, sulfite liquor, sawdust, anthracine oil, molasses, fats, greases, rosins, resins, and animal, vegetable or mineral oils.

Burning of the nodules is accompanied by bloating of the nodule size. Such bloating is caused by the evolution of gases which are trapped within the nodules. The extent of the bloating is of course important as it relates to aggregate density and strength. It may be controlled to the desired extent by controlling the proportions of materials used in preparing the nodule mixture.

The nodules form a sintered, clinker-like mass when they have been burned on a grate. This mass must subsequently be crushed and graded to the desired aggregate size. It may also be desirable to quench the sintered mass in water either before or after it has been crushed. Quenching in water improves the chemical and physical properties of the aggregate. The aggregate may be stored in a moist condition for some time after quenching in order to reduce the staining properties and to hydrate any uncombined lime.

Examples of suitable mixtures prepared according to the present invention are as follows:

*Example 1*

A mixture was prepared comprising one part of sewage sludge cake, two parts of fly ash, and 0.4 part of pulverized coal. The mixture contained 36.8 percent water. It was plastic and easily pelletized. The pellets were burned at a maximum bed temperature of 2200° F. on a stationary downdraft grate. They sintered well, with considerable glass and gas void formation. The aggregate had an approximate chemical analysis substantially as follows:

| | Percent by weight |
|---|---|
| $SiO_2$ | 50.38 |
| $Al_2O_3$ | 28.92 |
| $Fe_2O_3$ | 10.68 |
| $CaO$ | 5.29 |
| $MgO$ | 0.92 |
| $SO_3$ | 0.31 |
| $Na_2O$ | 0.41 |
| $K_2O$ | 1.80 |
| Loss | 0.93 |

The bulk density of the aggregate is indicated in the following table:

| Sieve Fraction | Loose Bulk Density—Pounds per Cubic Foot |
|---|---|
| −⅜″ +4M | 34.1 |
| −4M +8M | 38.5 |
| −8M +14M | 39.2 |
| −14M +48M | 46.5 |
| −48M +100M | 56.3 |
| −100M | 59.6 |

The following Examples II–XI were prepared in substantially the same manner as Example I:

| | Parts Sewage Sludge Cake | Parts Fly Ash | Parts Clay | Parts Coal | Parts Coke | B.t.u. per Pound of Aggregate | Bulk Density, −4M +8M, Pounds per Cu. Ft. |
|---|---|---|---|---|---|---|---|
| Example II | 1 | 2 | 0 | 0 | 0 | 2,740 | 31.8 |
| Example III | 1 | 2 | 0 | 0.06 | 0 | 3,130 | 30.6 |
| Example IV | 1 | 2 | 0 | 0.12 | 0 | 3,530 | 30.8 |
| Example V | 1 | 1 | 1 | 0.43 | 0 | 5,190 | 46.4 |
| Example VI | 1 | 1 | 0 | 0.08 | 0 | 5,190 | 35.8 |
| Example VII | 1 | 3 | 0 | 0.72 | 0 | 5,190 | 37.3 |
| Example VIII | 1 | 2 | 0 | 0 | 0.44 | 5,190 | 36.6 |
| Example IX | 1 | 2 | 0 | 0.20 | 0 | 4,000 | 35.3 |
| Example X | 1 | 2 | 0 | 0 | 0.22 | 4,000 | 35.5 |
| Example XI | 1 | 2 | 0 | 0.12 | 0 | 3,500 | 35.2 |

Each of these ten mixes burned satisfactorily. It appears that the strength of the aggregate increases as the bulk density increases. The bulk density may be increased by the addition of a material such as clay as shown in Example V.

Having thus described my invention, I claim:

1. A plastic pelletizable and burnable mixture consisting essentially of fly ash and sewage sludge cake in the ratio of from 1:1 to 3:1 parts by weight respectively; said sewage sludge sludge cake having a solids content of approximately 30% by weight with the remainder being water; said mixture having a total water content of from 25 to 40% by weight.

2. The composition of claim 1 and further characterized in that a small amount of a supplemental fuel is added thereto.

3. The composition of claim 1 and further characterized in that a small amount of clay is added thereto.

4. The composition of claim 1 and further characterized in that a small amount of sand is added thereto.

5. The composition of claim 1 and further characterized in that a small amount of clay, sand and a supplemental fuel is added thereto.

6. The process of preparing an aggregate from a mixture consisting essentially of fly ash and sewage sludge cake in the ratio of from 1:1 to 3:1 parts by weight respectively; said sewage sludge cake having a solids content of approximately 30% by weight with the remainder being water; said mixture having a total water content of from 25 to 40% by weight, comprising the steps of intermixing the fly ash and sewage sludge cake, pelletizing the fly ash-sewage sludge cake mixture, and igniting the pellets to cause combustion thereof and sintering of the mass.

7. The process of preparing an aggregate from a mixture consisting essentially of fly ash and sewage sludge cake in the ratio of from 1:1 to 3:1 parts by weight respectively; said sewage sludge cake having a solids content of approximately 30% by weight with the remainder being water; said mixture having a total water content of from 25 to 40% by weight, comprising the steps of intermixing the fly ash and sewage sludge cake, pelletizing the fly ash-sewage sludge cake mixture, igniting the pellets to cause combustion thereof, and crushing the resultant sintered material to aggregate size.

8. The process of preparing an aggregate from a mixture consisting essentially of fly ash and sewage sludge cake in the ratio of from 1:1 to 3:1 parts by weight respectively; said sewage sludge cake having a solids content of approximately 30% by weight with the remainder being water; said mixture having a total water content of from 25 to 40% by weight, comprising the steps of intermixing the fly ash and sewage sludge cake, adding a small amount of a supplemental fuel thereto, pelletizing said mixture, igniting the pellets to cause combustion thereof, quenching the sinter and crushing and grading the sinter to aggregate size.

9. The process of preparing an aggregate from a mixture consisting essentially of fly ash and sewage sludge cake in the ratio of from 1:1 to 3:1 parts by weight respectively; said sewage sludge cake having a solids content of approximately 30% by weight the remainder being water; comprising the steps of intimately intermixing the fly ash the sewage sludge cake to form a homogeneous mixture, adding sufficient water to bring the total water content of the mixture to from 25 to 40% by weight, pelletizing the fly ash-sewage sludge cake mixture, and igniting the pellets to cause combustion thereof whereby a sintered material is formed.

References Cited in the file of this patent

UNITED STATES PATENTS

| 1,895,159 | Greenawalt | Jan. 24, 1933 |
| 2,414,734 | Gelbman | Jan. 21, 1947 |
| 2,544,752 | Gelbman | Mar. 13, 1951 |
| 2,691,598 | Meurice et al. | Oct. 12, 1954 |
| 2,729,570 | Nichols | Jan. 3, 1956 |
| 2,933,796 | Somogyi | Apr. 26, 1960 |
| 2,946,112 | Tucker | July 26, 1960 |

FOREIGN PATENTS

| 613,943 | Great Britain | Dec. 7, 1948 |

OTHER REFERENCES

Babbit: Sewerage & Sewage Treatment, sixth ed., 1947, pages 488 and 492.